Nov. 4, 1941.　　　　　J. ZABAK　　　　2,261,322
BUTCHERING KNIFE
Filed July 30, 1940　　　2 Sheets-Sheet 1

Inventor
Joseph Zabak

By Clarence A. O'Brien

Attorneys

Nov. 4, 1941.　　　　J. ZABAK　　　　2,261,322
BUTCHERING KNIFE
Filed July 30, 1940　　　2 Sheets-Sheet 2
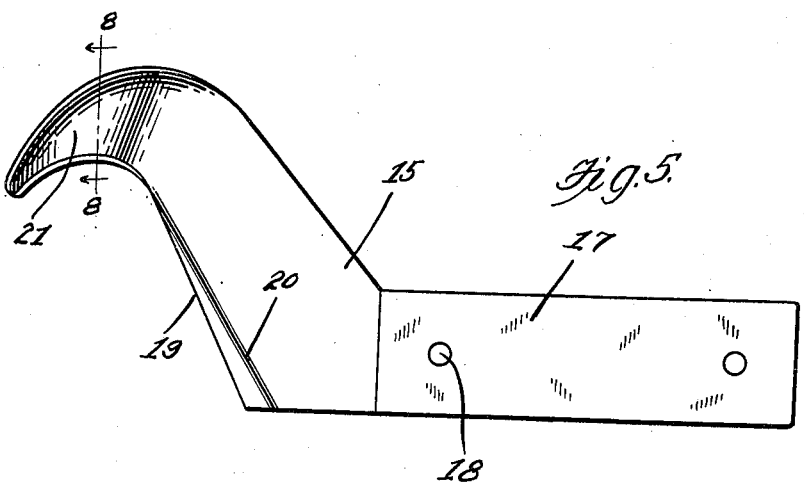
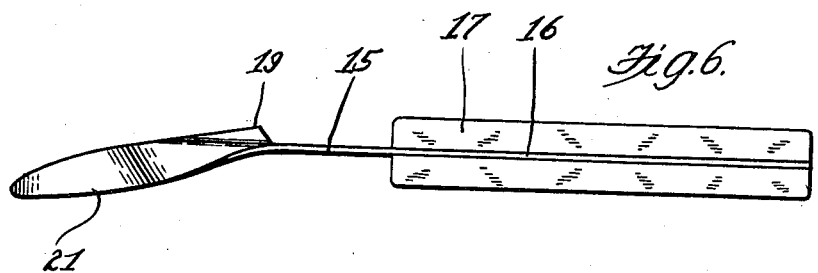
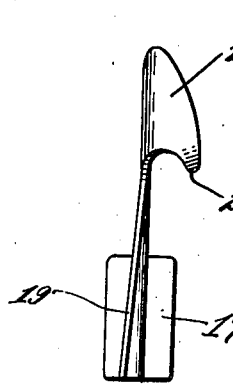
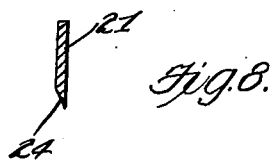
Inventor
Joseph Zabak
By Clarence A. O'Brien
Attorneys Patented Nov. 4, 1941

2,261,322

UNITED STATES PATENT OFFICE 2,261,322

BUTCHERING KNIFE

Joseph Zabak, Philadelphia, Pa.

Application July 30, 1940, Serial No. 348,489

2 Claims. (Cl. 30—314)

The present invention relates to new and useful improvements in knives and has for its primary object to provide a pair of butchering knives designed primarily for use in removing bones from the meat and embodies a pair of knives of this character adapted for either simultaneous or independent use, one of the knives being designed for use by the right hand of the butcher while the other of said knives is designed for use by the left hand, and both of said knives embodying a curved pointed extremity adapted to cooperate for cutting entirely around the bone and under the bone for conveniently removing the bone from the meat without the mutilation of the meat.

A further important object is to provide a pair of butchering knives of this character of simple and practical construction, which are efficient in performance, relatively inexpensive to manufacture and otherwise well adapted for the purposes for which the same are intended.

Other objects and advantages reside in the details of construction as more fully hereinafter described and claimed, reference being had to the accompanying drawings forming part hereof, wherein like numerals refer to like parts throughout, and in which—

Figure 1:
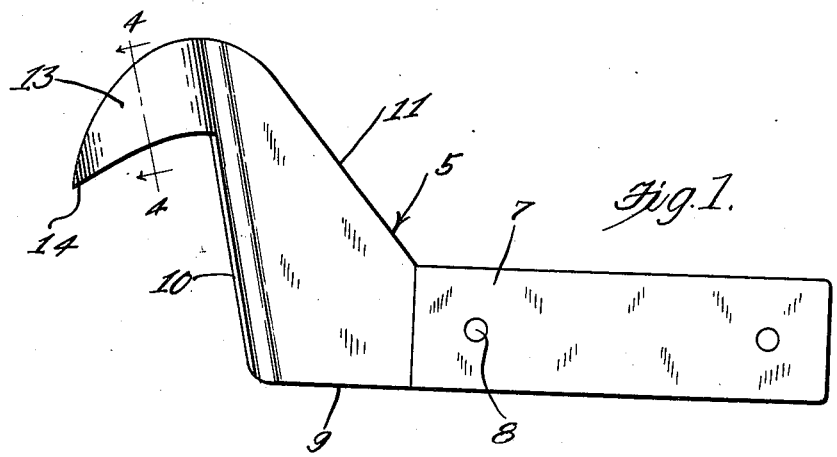
Figure 1 is a side elevational view of the lefthand knife.
Figure 2:
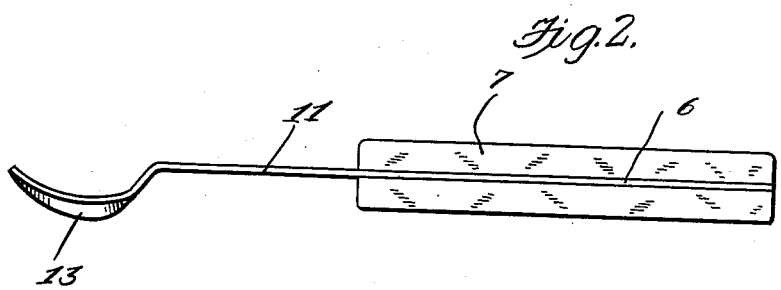
Figure 2 is a rear edge elevational view thereof.
Figure 4:
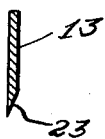

Figure 4 is a sectional view through the curved pointed end of the blade taken substantially on the line 4—4 of Figure 1, Figure 5 is a side elevational view of the right hand knife, Figure 6 is an edge elevational view of the back of the knife, Figure 7 is a front elevational view, and Figure 8 is a sectional view through the pointed curved end of the blade taken substantially on the line 8—8 of Figure 5.

Referring now to the drawings in detail and with particular reference to Figures 1 to 4 inclusive, the numeral 5 designates the knife blade generally which includes a flat shank portion 6 to the opposite sides of which are secured the wooden, or similar, handle sections 7, the handle sections being secured in position by means of rivets or the like 8.

The bottom edge of the blade projects outwardly from the bottom edge of the handle as shown at 9 and terminates in an upwardly inclined front edge 10 disposed in converging relation with respect to the upper edge 11 which extends upwardly and forwardly at an inclined angle from the front edge of the handle 7. The front edge 10 is bent angularly with respect to the surface of the blade, as shown at 12.

Figure 3:
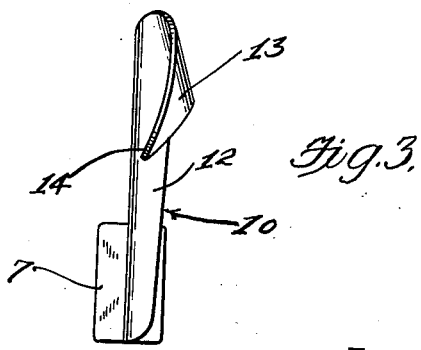
Figure 3 is a front elevational view.

Formed at the upper edge of the blade and projecting forwardly from the front upper edge 10 is a curved pointed extension 13, the extension being substantially hook-shaped and inclined downwardly and curved substantially transversely with respect to the handle with the free pointed end 14 of the extension extending in a direction opposite to the angular edge 12, as clearly shown in Figure 3 of the drawings.

The right hand knife is shown in Figures 5 to 8 inclusive of the drawings, and includes the blade 15 which likewise includes the shank portion 16 secured between handle members 17 by means of rivets 18. The blade extends forwardly and upwardly with respect to the handle in a substantially similar manner to the blade 9 of Figures 1 to 4, inclusive, except that the front edge 19 of the blade 15 is curved along the line 20 in a direction opposite from the angular edge 12 of the left hand knife, the curved edge 20 merging with the front edge of the blade adjacent its upper edge as shown in Figures 5 and 7 of the drawings.

The upper end of the blade 15 is likewise provided with the hook-shaped extension 21 which is curved in a direction oppositely from the curved extension 13 and likewise in an opposite direction with respect to the curved front edge 20 of the blade 15. The pointed end 22 of the extension 21 likewise extends in a downward direction as shown in Figures 5 and 7 of the drawings.

The inclined front edge 10 of the left hand knife and the communicating edge of the extension 13 are bevelled as shown at 23 to form the cutting edge of the knife, and the right hand knife is similarly constructed with the front edge 19 and the communicating curved edge of the extension 21 likewise being bevelled as shown at 24.

When using the knives the right hand knife is adapted for cutting partly around a bone at the right hand side of the bone, the curved extension cutting partly under the bone, while the left hand knife similarly and simultaneously or subsequently cuts around the remainder of the bone at the left side thereof.

It is believed the details of construction, advantages and manner of use of the device will be readily understood from the foregoing without further detailed explanation.

Having thus described the invention, what I claim is—

1. A butchering knife comprising a blade having a shank, a handle secured to the shank, said blade extending forwardly from the handle at an inclined angle in a direction toward the back edge of the handle, the front edge of the blade being bent toward one side of the blade and a transversely curved hook-shaped extension at the upper forward edge of the blade extending in a direction opposite from said bent edge and terminating in a pointed extremity.

2. A butchering knife comprising a blade having a shank, a handle secured to the shank, said blade extending forwardly from the handle at an inclined angle in a direction toward the back edge of the handle, the front edge of the blade being bent toward one side of the blade and a transversely curved hook-shaped extension at the upper forward edge of the blade extending in a direction opposite from said bent edge and terminating in a pointed extremity, said bent edge being adapted to engage the side of a bone for cutting the meat therefrom and said curved extension being adapted to engage partly under the bone for likewise cutting the meat therefrom.

JOSEPH ZABAK.